Jan. 29, 1957    T. R. THOMSEN    2,779,407
METHOD AND APPARATUS FOR FORMING A SPRING OF PREDETERMINED
LENGTH FROM COIL SPRING STOCK
Filed Dec. 23, 1954
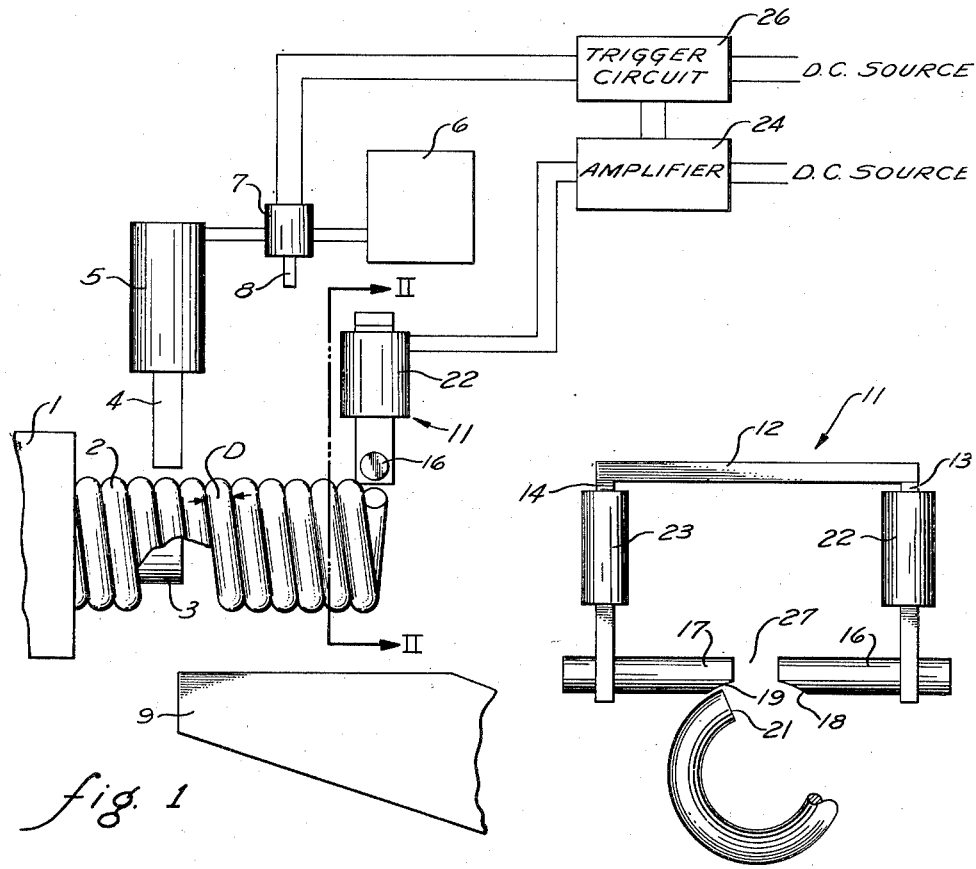
fig. 1
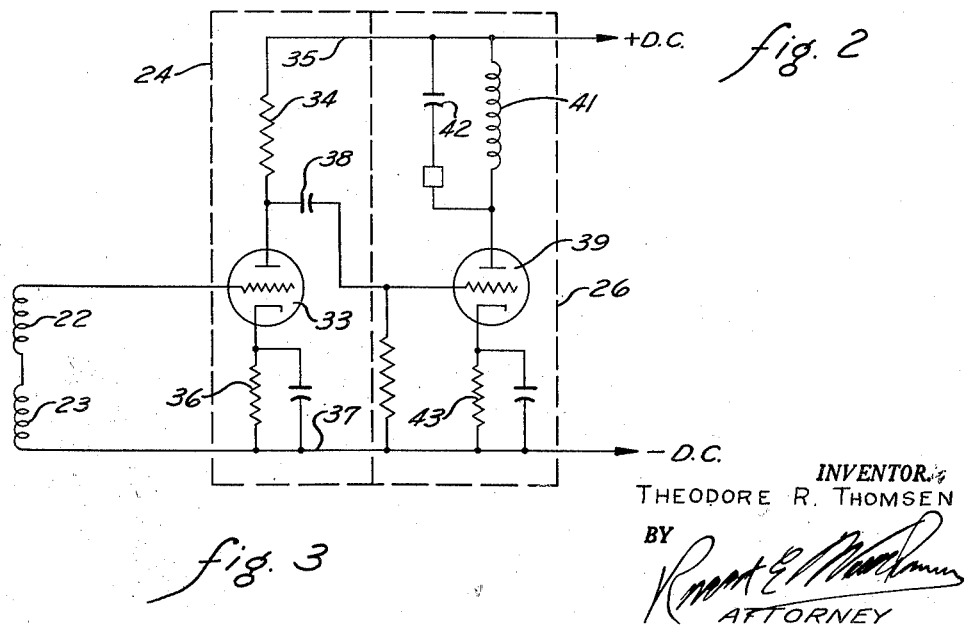
fig. 2
fig. 3
INVENTOR.
THEODORE R. THOMSEN
BY
ATTORNEY United States Patent Office 2,779,407
Patented Jan. 29, 1957

2,779,407

METHOD AND APPARATUS FOR FORMING A SPRING OF PREDETERMINED LENGTH FROM COIL SPRING STOCK

Theodore R. Thomsen, Farmington, Mich., assignor to Robotron Corporation, Detroit, Mich., a corporation of Michigan Application December 23, 1954, Serial No. 477,374

3 Claims. (Cl. 164—17)

This invention relates to a device for automatically giving a signal upon the attainment by the product of a spring making machine of a predetermined length, and it particularly refers to such a device wherein the leading end of the spring shunts a flux path and thereby actuates the signal.

In the making of springs by automatic equipment, it is common to provide a device responsive to the length of spring appearing beyond the forming die for automatically actuating a device for cutting the material thereof to complete the manufacture of a spring of predetermined length. Inasmuch as the use of the finished spring may often be critically affected by variations in its length, it is essential that the length of the spring be very accurate. Further, even where the ultimate function of the spring may not be adversely affected by minor variations in length, it is still necessary as a matter of economics to control such length accurately. This follows from the fact that the springs sold as being of a given length must necessarily be at least of such given length and that a manufacturer must count as loss any excess over that length. When a very large number of springs are produced on a mass production basis, such excess length and consequent loss may be a very large item.

Accordingly, it is a major object of the invention to provide a device for actuating a signal in an extremely accurate relationship to the precise length of a spring as it is moved simultaneously both axially and rotatably.

It is a further object of the invention to provide a device which will actuate a cut-off mechanism, or other signal, with respect to coil spring material coming from a spring forming machine automatically upon the attainment by the free end of the spring material of a predetermined position.

A further object of the invention is to provide such a device which will be entirely free from the necessity for contacting and moving mechanical devices by the leading end of the spring.

A further object of the invention is to provide a device which will be extremely sensitive to the precise rotative position of the free end of the spring whereby to control the exact length of the spring with a high degree of accuracy.

A further object of the invention is to provide a device which will produce an electrical impulse upon the attainment by the leading end of a spring, as it is discharged from a spring making machine, of a precisely predeterminable position and wherein no mechanically moving parts excepting the spring itself are required for the production of said electrical impulse.

A further object of the invention is to provide a device, as aforesaid, which is extremely simple in its physical structure, and is accordingly both inexpensive to manufacture and inexpensive to maintain.

Other objects and purposes of this invention will be apparent to persons acquainted with equipment of this general type upon reading the following specification and inspecting the accompanying drawings.

In the drawings:

Figure 1 is a schematic indication of a device embodying the invention.

Figure 2 is a view of the impulse creating portion of the device as viewed approximately on the line II—II of Figure 1.

Figure 3 is a diagram illustrating one available circuit for operating the apparatus.

In general, the invention consists of utilizing the simultaneously advancing and rotating free end of the spring for shunting an air gap and thereby changing the magnitude of flux flowing from a permanent magnet past a coil and utilizing the impulse thereby created in said coil to actuate suitable spring cut-off mechanism or other signal.

Turning now to the drawings, Figure 1 is a schematic illustration of equipment embodying the invention. The spring forming portion of a conventional spring making machine is indicated at 1 with the spring 2 coming out therefrom and being supported on a mandrel 3. A cut-off device 4 is shown in position for cutting the spring coil at a point adjacent the end of said mandrel in response to fluid pressure created in a cylinder 5. The pressure originates in a reservoir 6 under the control of a conventional solenoid controlled valve 7, said valve in one position conducting fluid pressure from the reservoir 6 into the cylinder 5 and in its opposite position permitting said fluid to return by a conduit 8 to the low pressure side of the pressure creating apparatus, as to the atmosphere where compressed air is used as the pressure fluid. A suitable receptacle 9 of any conventional sort is provided for receiving springs as they are cut-off, which receptacle may conveniently be a chute for conducting a cut off spring to a storage bin or to means for further processing of the spring.

All of the foregoing is conventional and needs no further detailing.

The sensing device for producing the electrical impulse by which the solenoid controlled valve 7 is actuated, is indicated generally at 11. It consists of a bar-shaped permanent magnet 12 to which are affixed two depending soft iron members 13 and 14, each of which has a horizontally extending, and horizontally adjustable, bar 16 and 17. Said sensing device 11 is positioned immediately above the spring coil as it extends beyond the end of the mandrel 3. Accuracy and precision of operation will be improved by slightly scalloping the lower adjacent portions 18 and 19 of the members 16 and 17, respectively, to permit the spring coil to pass even more closely to the center thereof.

The coil 2 is caused to advance axially a distance of approximately the diameter "D" of the spring stock with each rotation of the coil. The sensing device 11 is so arranged with respect to the propelling mechanism by which the spring coil is moved axially that as the free or leading end 21 of the coil passes substantially under the sensing device 11 it will also be in the portion of its circumferential travel as to bring it past, beneath, and substantially in radial alignment with the horizontal members 16 and 17.

The coils 22 and 23 are arranged around each of the vertical soft iron members 13 and 14 and are connected in series with each other for maximum sensitivity although a single coil may be used if desired. Said coils 22 and 23 create a pulse which passes through an amplifier 24 and the output of the amplifier 24 is conducted to a trigger circuit 26. The output of the trigger circuit is conducted to the solenoid controlled valve 7 for energizing same.

Referring now to Figure 3. There is shown one typical circuit constituting an amplifier 24 and the trigger circuit 26. It will be evident that this is for illustrative purposes only and that many other specific circuits may be selected.

The serially connected pick-up coils 22 and 23 are connected at one end to the control electrode of a vacuum tube 33 whose anode is connected through a protective resistance 34 to a conductor 35 which in turn is connected to the positive side of a D. C. source. The cathode of said vacuum tube is connected through a resistor-capacitor parallel circuit 36 to a conductor 37 which in turn is connected to the negative side of the D. C. source. The other end of the pick-up coils 22 and 23 is also connected to the conductor 37.

The anode of the tube 33 is connected through a capacitor 38 to the control electrode of a further vacuum tube 39. The anode of said vacuum tube is connected through the winding 41 of a relay to the conductor 35, said relay controlling the energizing of the solenoid in the valve 7. A capacitor 42 may be connected around the winding 41 to hold the solenoid winding 41 energized, if desired, for a slightly longer period than it would be energized by the circuit directly. The cathode of the tube 39 is connected through a resistance-capacitor parallel circuit 43 to the conductor 37.

It will be recognized that circuit 24 is merely a conventional amplifier circuit and may be replaced by any other desirable amplifier circuit. Likewise the trigger circuit 26 is conventional and may be replaced by any other convenient trigger circuit.

Operation

The operation has been somewhat indicated above but will be reviewed briefly in the interest of completeness.

The spring forming machine 1 shapes the spring 2 in a conventional manner on the mandrel 3 and propels the finished spring with both an axial and circumferential movement. The axial movement is so related to the circumferential movement that one rotation of the spring will advance it an axial distance approximately equal to the diameter of the stock from which the spring is made. While the spring is thus progressing and before it has reached the sensing device 11, the permanent magnet 12 creates lines of flux which flow through the soft iron members 13 and 16 across the air gap 27 and thence through the soft iron members 17 and 14 back to the magnet 12. So long as nothing happens to alter this flow of flux, the electric circuit remains in a quiescent state.

However, as the leading end 21 of the spring 2 approaches the sensing device 11, it will reach a position such that said leading end is substantially aligned, as shown in Figure 1, with the members 16 and 17 and the said leading end will approach close to and substantially parallel with the center line of the air gap 27. Thus, the leading end of the spring acts as a shunt across said air gap and will materially increase the flow of flux through said flux path and thereby create an impulse in the coils 22 and 23. It will be appreciated that the magnitude of said impulse created in said coils will be precisely related to the exact position of the end 21 of the spring to the air gap inasmuch as the increase in flux flow will be an exact function of the amount of the air gap which is effectively shunted by the leading portion of the spring.

The impulse from the coils 22 and 23 is then led to the amplifier, therein amplified in a conventional manner, and applied to the trigger circuit. The trigger circuit is here shown to be the winding of a relay which when closed energizes the solenoid of the solenoid valve 7 to operate it in a conventional manner. Obviously, other trigger circuits, as one involving a thyratron, may also be utilized.

However, it will be appreciated that under some circumstances the amplifier output itself may be conducted directly to the winding of the solenoid. Thus, the cut off mechanism may be operated in a very exacting relationship to the precise length of the spring extending beyond the cut off mechanism and a product of the operation and the springs produced by the operation will be of very closely and uniformly controlled length.

While the specific embodiment of the invention has been used for illustrative purposes, it will be understood that various variations may be made from the specific apparatus here shown without departing from the scope of the invention and accordingly the hereinafter appended claims are to be construed to be as including said variations excepting as said claims may by their own terms expressly require otherwise.

I claim:

1. In a device for forming a spring of predetermined length from coil spring stock, which is being simultaneously rotated and advanced along its axis, the combination comprising: a permanent magnet; soft iron means providing a flux path from each end of said permanent magnet to a zone substantially adjacent to the path of movement of the spring stock at the point on said path corresponding to said predetermined length, said zone being defined by mutually opposed and spaced ends of said soft iron means, said ends being spaced apart a distance materially less than the diameter of the coil of spring stock and being positioned closely adjacent, but radially outwardly of, the cylindrical path defined by the radially outermost edge of said coil; a winding adjacent a portion of said soft iron means, whereby advancement of the leading end of said spring stock in a circumferential direction will shunt the flow of flux across said zone and thereby create an impulse in said winding; a trigger circuit; circuitry actuating said trigger circuit upon the appearance of an impulse in said winding; and means actuated by said trigger circuit for cutting said coil stock at a point spaced a predetermined distance from said zone.

2. The structure defined in claim 1 wherein said flux path is comprised of a pair of soft iron angle members extending from each end of said permanent magnet and having air gap zone defining portions substantially coaxial with each other, whose ends are facing each other and spaced apart to define an air gap and whose common axis is arranged substantially perpendicular to the axis of said spring and is spaced perpendicularly from said axis a distance only sufficient to permit said spring to pass said members without contacting same.

3. In a method for forming a coil spring of predetermined length from magnetic coil spring stock, comprising the steps: moving said coil spring stock simultaneously axially and circumferentially; establishing a flux path, including an air gap, adjacent the path of movement of said coil spring stock, said air gap being of width materially less than the diameter of said coil and extending circumferentially of said coil, said air gap being spaced a predetermined distance from a reference point in a direction axially along the path of movement of said coil spring stock; utilizing the change in the flux flow, created when the leading end of the coil spring stock passes said air gap in a direction circumferentially of said coil, for energizing cut-off means at said reference point.

References Cited in the file of this patent

UNITED STATES PATENTS

| 460,695 | White | Oct. 6, 1891 |
| 805,724 | Harter | Nov. 28, 1905 |
| 1,797,864 | Harlandt | Mar. 24, 1931 |
| 1,923,751 | Schrier et al. | Aug. 22, 1933 |
| 2,150,440 | Hargreaves | Mar. 14, 1939 |
| 2,527,170 | Williams | Oct. 24, 1950 |